United States Patent
Hunold (10) Patent No.: US 10,232,466 B2
(45) Date of Patent: Mar. 19, 2019

(54) TRANSMISSION SHAFT AND METHOD AND DEVICE FOR THE PRODUCTION THEREOF

(71) Applicant: ZF Friedrichshafen AG, Friedrichshafen (DE)

(72) Inventor: Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 383 days.

(21) Appl. No.: 15/103,325

(22) PCT Filed: Nov. 12, 2014

(86) PCT No.: PCT/EP2014/074300
§ 371 (c)(1),
(2) Date: Jun. 10, 2016

(87) PCT Pub. No.: WO2015/086243
PCT Pub. Date: Jun. 18, 2015

(65) Prior Publication Data
US 2016/0311053 A1  Oct. 27, 2016

(30) Foreign Application Priority Data

Dec. 12, 2013  (DE) .................. 10 2013 225 714

(51) Int. Cl.
*B23K 9/00* (2006.01)
*F16C 3/02* (2006.01)
(Continued)

(52) U.S. Cl.
CPC .......... *B23K 20/125* (2013.01); *B23K 9/0026* (2013.01); *B23K 9/028* (2013.01);
(Continued)

(58) Field of Classification Search
CPC ............. F16H 57/0037; F16H 57/0025; F16H 57/0018
See application file for complete search history.

(56) References Cited

U.S. PATENT DOCUMENTS 3,699,639 A  10/1972  Ditto
4,436,980 A   3/1984  Pache
(Continued)

FOREIGN PATENT DOCUMENTS

DE    3018199   11/1981
DE     201822    8/1983
(Continued)

*Primary Examiner* — Terence Boes
(74) *Attorney, Agent, or Firm* — Cozen O'Connor (57) ABSTRACT

A transmission shaft of a countershaft-type manual transmission is constructed from a plurality of hollow shaft portions which are butt press welded to one another, at least two of which hollow shaft portions are provided in each instance with at least one helical toothing of a fixed wheel of a spur gear stage. The hollow shaft portions provided with a helical toothing are connected to the respective adjacent hollow shaft portion in each instance so as to be rotated by a correction angle ($\Delta\alpha$) around their center axis in proportion to a deviation ($\Delta x$) from their axial target position, wherein the ratio between the correction angle ($\Delta\alpha$) and the axial deviation ($\Delta x$) corresponds to the pitch (s) of the helical toothing ($\Delta\alpha/\Delta x = s$).

15 Claims, 5 Drawing Sheets

(51) Int. Cl.
  *B23K 20/12*   (2006.01)
  *B23K 9/028*   (2006.01)
  *F16D 1/068*   (2006.01)
  *F16H 3/093*   (2006.01)
  *F16H 3/095*   (2006.01)
  *F16H 37/04*   (2006.01)
  *F16H 57/00*   (2012.01)

(52) U.S. Cl.
  CPC ............ *B23K 20/12* (2013.01); *B23K 20/126* (2013.01); *B23K 20/129* (2013.01); *F16C 3/023* (2013.01); *F16D 1/068* (2013.01); *F16H 3/093* (2013.01); *F16H 37/046* (2013.01); *F16H 57/0025* (2013.01); *F16C 2361/61* (2013.01); *F16H 3/095* (2013.01)

(56) References Cited

U.S. PATENT DOCUMENTS 4,768,839 A * 9/1988 Spindler .............. B23K 20/129
                                                   301/124.1
6,021,938 A    2/2000 Boeck
6,036,077 A *  3/2000 Kingston .............. B23K 20/129
                                                   228/114
2009/0242613 A1  10/2009 Kawaura
2015/0298249 A1  10/2015 Buchler et al.
2018/0031044 A1*  2/2018 Stoppel .................... F16D 1/06
2018/0162524 A1*  6/2018 Ehinger .................. B64C 27/14

FOREIGN PATENT DOCUMENTS

| DE | 19523240 | 3/1997 |
| DE | 29922396 | 11/2000 |
| DE | 102005036681 | 2/2006 |
| DE | 102006016099 | 10/2007 |
| DE | 2008064267 | 8/2009 |
| DE | 202012103219 | 12/2013 |
| EP | 00406673 | 1/1991 |
| EP | 1624204 | 2/2006 |
| GB | 2249512 | 5/1992 |
| WO | WO9701412 | 1/1997 |

* cited by examiner

TRANSMISSION SHAFT AND METHOD AND DEVICE FOR THE PRODUCTION THEREOF

PRIORITY CLAIM

This is a U.S. national stage of application No. PCT/EP2014/074300, filed on Nov. 12, 2014. Priority is claimed on the following application(s): Country: Germany, Application No.: 10 2013 225 714.7, Filed: Dec. 12, 2013, the content of which is incorporated herein in its entirety by reference.

1. Field of the Invention

The invention is directed to a transmission shaft of a countershaft-type manual transmission which forms one of at least two substantially identical countershafts and which is constructed from a plurality of hollow shaft portions which are butt press welded to one another, at least two of which hollow shaft portions are provided in each instance with at least one helical toothing of a fixed wheel of a spur gear stage. The invention is further directed to a method and to a device for the production of a transmission shaft of this type from a plurality of press welded hollow shaft portions.

2. Background of the Invention

Transmission shafts of countershaft-type manual transmissions such as input shafts, countershafts, main shafts or output shafts are usually constructed as massive solid shafts. The fixed wheels of spur gear stages such as input constants, switchable transmission gear stages or output constants which are arranged on these transmission shafts are often produced as separate component parts which are pressed onto the transmission shaft at correspondingly constructed bearing seats and are preferably additionally secured by positive engagement, for example, by pinning, against axial movement. However, it is also known that the teeth of fixed wheels can be incorporated in corresponding annular strips of the transmission shaft through suitable machining processes such as rolling or milling. In this case, the fixed wheels are integrally connected to the respective transmission shaft. However, a disadvantage in solid transmission shafts of this kind consists in their large mass, which increases the weight of the manual transmission in question, and in the resulting high mass moment of inertia, so that the respective transmission shaft must be retarded or accelerated against the resistance of this high mass moment of inertia during a shift-dependent synchronizing of the target gear insofar as this transmission shaft is an input shaft or countershaft. Further, the increased use of material increases costs.

To avoid these disadvantages, it has been suggested to construct transmission shafts as hollow shafts without compromising strength. These are known as assembled transmission shafts and are constructed from a plurality of hollow shaft portions which are connected to one another by frictional engagement, positive engagement or bonding.

A corresponding transmission shaft comprising three hollow shaft portions is described in DE 10 2005 036 681 A1. The hollow shaft portions which are preferably produced by massive forming are joined together by laser welding or by spin welding at abutted annular surfaces. The axially outer hollow shaft portions have been closed at their free ends by swaging. The fixed wheels arranged on the transmission shaft are produced as separate component parts and are pressed on associated bearing seats of the relevant hollow shaft portions.

A method for the production of a hollow transmission shaft and a hollow transmission shaft produced according to this method are known from DE 10 2006 016 099 B4. The hollow transmission shaft is built of a plurality of axially successive hollow shaft portions, at least two of which hollow shaft portions are provided, respectively, with a toothing of a fixed wheel arranged on the hollow transmission shaft. The hollow shaft portions are connected to one another at abutted annular surfaces by spin welding. The teeth of the relevant hollow shaft portions have been finish-machined before being joined. The hollow shaft portions are joined together with high precision with respect to their circumferential target angular position and their radial and axial offset. However, DE 10 2006 016 099 B4 does not specifically show how this is to be achieved.

DE 10 2008 064 267 A1 describes a transmission shaft which is constructed as a hollow shaft and which likewise comprises a plurality of hollow shaft portions and a method for producing it. For centering relative to one another, the hollow shaft portions have plug-in contours at the ends facing one another. These plug-in contours engage coaxially one inside the other and have a plurality of conically inclined friction contact surfaces which are offset in a steplike manner for connecting the hollow shaft portions by spin welding. Further, the hollow shaft portions have annular radial stop surfaces at the edge of the plug-in contours for axial alignment of the hollow shaft portions. The hollow shaft portions can be connected to one another with high radial and axial precision through the shape of the plug-in contours, but an elaborate mechanical machining of the hollow shaft portions is required for producing the plug-in contours with the friction surfaces and stop surfaces. Further, the arrangement of the plug-in contours requires an unfavorably large thickness of the hollow shaft portions.

Particularly when a countershaft-type manual transmission such as that provided in the present instance has at least two substantially identical countershafts which are each constructed from a plurality of hollow shaft portions which are butt press welded to one another and partially provided with a helical toothing of a fixed wheel of a spur gear stage, the problem arises of an accurate alignment of the circumferential target angular position of the hollow shaft portions provided with a helical toothing. Two countershafts in a countershaft-type manual transmission serve to distribute a torque to be transmitted to two parallel force transmission paths and accordingly to achieve a relatively compact and lightweight construction and a high transmission efficiency of the respective manual transmission. An exact alignment of the circumferential angular position of the toothings of the fixed wheels is required for a uniform distribution of the torque to be transmitted, since these toothings are in toothed engagement pairwise in each instance with an individual counter-gearwheel or another transmission shaft, for example, a fixed wheel of an input constant that is arranged on an input shaft so as to be fixed with respect to rotation relative to it or a loose wheel of a switchable transmission gear stage which is rotatably supported on an intermediate shaft or output shaft.

In the known press welding methods like spin welding and electric arc welding with magnetically moving arcs, the hollow shaft portions to be connected to one another are joined together axially with high pressing force after the contact surfaces facing one another are plasticized, which necessarily entails a certain axial tolerance. Accordingly, the axial joining together of the hollow shaft portions may result in a deviation of the toothings arranged thereon from their axial target position, which deviation has the effect of twisting the respective fixed wheels or hollow shaft portions in the rest of the implementation as helical toothings. As a result, there is no longer an optimal toothing engagement with the associated counter-gearwheel.

Therefore, it is an object of the invention to propose a transmission shaft of the type mentioned above which is constructed from a plurality of hollow shaft portions which are butt press welded to one another and whose hollow shaft portions which are provided with at least one helical toothing of a fixed wheel of a spur gear stage are exactly axially aligned in joined condition with respect to their circumferential target angular position. Further, a method and a device for producing a transmission shaft of this type from a plurality of hollow shaft portions which are press welded to one another are described.

SUMMARY OF THE INVENTION

Therefore, the invention is directed first to a transmission shaft of a countershaft-type manual transmission which forms one of at least two substantially identical countershafts and which is constructed from a plurality of hollow shaft portions which are butt press welded to one another, at least two of which hollow shaft portions are provided in each instance with at least one helical toothing of a fixed wheel of a spur gear stage. In order to meet this object with respect to the transmission shaft, it is further provided that the hollow shaft portions provided with a helical toothing are connected to the respective adjacent hollow shaft portion in each instance so as to be rotated by a correction angle $\Delta\alpha$ around their center axis in proportion to a deviation $\Delta x$ from their axial target position, where the ratio between the correction angle $\Delta\alpha$ and the axial deviation $\Delta x$ corresponds to the pitch s of the helical toothing ($\Delta\alpha/\Delta x=s$).

Accordingly, the invention is based on a transmission shaft of a countershaft-type manual transmission which forms one of at least two substantially identical countershafts and which is constructed from a plurality of hollow shaft portions which are butt press welded to one another. At least two of the hollow shaft portions are provided, respectively, with at least one helical toothing of a fixed wheel of a spur gear stage.

The teeth of the at least two countershafts engage identically in the respective shared counter-gearwheel due to the fact that the hollow shaft portions provided with a helical toothing are connected to the respective adjacent hollow shaft portion in each instance so as to be rotated by a correction angle $\Delta\alpha$ around their center axis in proportion to a deviation $\Delta x$ from their axial target position corresponding in each instance to the pitch s of their helical toothing. The counter-gearwheel can be, for example, the fixed wheel of an input constant, which fixed wheel is arranged on the input shaft of the transmission so as to be fixed with respect to rotation relative to it, or the loose wheel of a switchable transmission gear stage, which loose wheel is rotatably supported on the output shaft or main shaft of the transmission and can be connected to the latter so as to be fixed with respect to rotation relative to it via an associated gear clutch. As a result of the optimal toothing engagement of the toothings of the at least two countershafts with the respective counter-gearwheel, the flow of force takes place in equal parts via the at least two force transmission paths, each comprising one of the countershafts.

The hollow shaft portions of the transmission shaft are preferably connected to one another by spin welding. In this press welding method, the heating of the material is limited to a narrow region close to the facing contact surfaces of the hollow shaft portions and is identical along the circumference, i.e., rotationally symmetrical with respect to the center axis of the hollow shaft portions. Therefore, a thermally induced warping of the hollow shaft portions and resulting bending of the transmission shaft are extensively ruled out.

For the same reasons, the hollow shaft portions can also be connected to one another by electric arc welding with magnetically moving arcs.

Since the above-mentioned press welding methods are carried out with a certain axial tolerance when joining the hollow shaft portions together, the helical toothings of the hollow shaft portions are preferably carried out with an axial excess width relative to their counter-gearwheels to compensate for the axial tolerances. This ensures that the toothing engagement between the toothings of the hollow shaft portions and the associated counter-gearwheels always takes place over the full tooth width of the counter-gearwheels independently of the existing axial tolerances.

As is conventional, per se, the transmission shaft has a bearing support with a fixed bearing and a loose bearing. The fixed bearing is preferably arranged at the first hollow shaft portion to which the second hollow shaft portion is fastened, and the loose bearing is preferably arranged at the last hollow shaft portion which is fastened to the penultimate hollow shaft portion. By arranging the fixed bearing at the first hollow shaft portion, the latter is fixed in its axial target position in the transmission housing of the manual transmission. Joint-related axial displacements of the rest of the hollow shaft portions are then made possible and compensated in a bearing-related manner by the loose bearing mounted at the last hollow shaft portion.

However, it can also be provided for the bearing support of the transmission shaft with a fixed bearing and a loose bearing that the fixed bearing is arranged at the last hollow shaft portion which is fastened to the penultimate hollow shaft portion, and the loose bearing is arranged at the first hollow shaft portion to which the second hollow shaft portion is fastened. Accordingly, the last hollow shaft portion is fixed in its axial target position in the transmission housing of the manual transmission via the fixed bearing. The rest of the hollow shaft portions are then rotated back correspondingly through the correction of the circumferential rotational angle positions carried out during the axial joining so that an optimal toothing engagement with the counter-gearwheels also results in this arrangement of the fixed bearing and loose bearing.

With respect to the construction of the above-mentioned bearings, it is preferably provided that the fixed bearing is constructed as a grooved ball bearing and the loose bearing is constructed as a cylindrical roller bearing.

The object relating to the method for producing a transmission shaft is met in that the hollow shaft portions provided with a helical toothing are rotated by a correction angle $\Delta\alpha$ around their center axis in proportion to a deviation $\Delta x$ from their axial target position in each instance after the plasticizing of the material at the facing contact surfaces during the axial joining together of the adjacent hollow shaft portions, where the ratio between the correction angle $\Delta\alpha$ and the axial deviation $\Delta x$ corresponds to the pitch s of the helical toothing ($\Delta\alpha/\Delta x=s$).

Accordingly, this method relates to the production of a transmission shaft of a countershaft-type manual transmission which forms one of at least two substantially identical countershafts and which is constructed from a plurality of hollow shaft portions which are butt press welded to one another. At least two of the hollow shaft portions are provided in each instance with at least one helical toothing of a fixed wheel of a spur gear stage.

In order to achieve an optimal toothing engagement of the helical toothings of the at least two countershafts with the associated counter-gearwheels and, accordingly, an even distribution of the transmitted torque to the two force transmission paths comprising one countershaft in each instance, the hollow shaft portions provided with a helical toothing are rotated according to the method by a correction angle $\Delta\alpha$ around their center axis in proportion to a deviation $\Delta x$ from their axial target position in each instance after the plasticizing of the material at the facing contact surfaces during the axial joining to the adjacent hollow shaft portion. In this regard, the ratio between the correction angle $\Delta\alpha$ and the axial deviation $\Delta x$ corresponds in each instance to the pitch s of the helical toothing ($\Delta\alpha/\Delta x=s$) so that the effect of joint-related axial displacements of the hollow shaft portions on the toothing engagement with the counter-gearwheels is compensated.

The rotation of the hollow shaft portions can be carried out by means of a rotary drive in driving connection with a pressure die which receives the respective hollow shaft portion at its end. This can be a separate rotary motor which can be controlled mechanically independently of the axial forward feed during the joining of the hollow shaft portions. However, it can also be a passive rotary drive which is coupled with the axial forward feed through an engine-internal coupling gear stage. Coupling gear stages of this kind, by which a rotary drive is coupled with an axial forward feed, are known from lathes, for example.

It is preferable, however, that the rotation of the hollow shaft portions takes place by a positive-engagement rotary guide which is arranged between a cylindrical portion of the pressure die receiving the respective hollow shaft portion at its end and a stationary bore hole and which has the pitch s of the helical toothing. The expenditure on apparatus for a separate rotary drive of the pressure die and for an engine-internal coupling gear stage can be avoided with this rotary guide of the pressure die.

The hollow shaft portions are preferably connected to one another by spin welding. The plasticizing of the contact surfaces facing one another is carried out in each instance through rotation of a hollow shaft portion which is not axially displaceable and by a simultaneous axially pressing of the nonrotatable hollow shaft portion against the rotatable hollow shaft portion with moderate pressing force via the pressure die, and the joining together of the hollow shaft portions is carried out after the plasticizing of the contact surfaces by axially pressing the nonrotatable hollow shaft portion against the rotatable hollow shaft portion with high pressing force by the pressure die.

Alternatively, the hollow shaft portions can also be connected to one another through electric arc welding with magnetically moving arcs, and the plasticizing of the contact surfaces facing one another is carried out in each instance through a magnetically controlled arc circulating between stationary poles and the region of the contact surfaces, and the joining together of the hollow shaft portions is carried out after the plasticizing of the contact surfaces by axially pressing the one hollow shaft portion against the other hollow shaft portion with high pressing force by the pressure die.

The object of the invention relating to the device for producing a transmission shaft is met in that a pressure die is provided with a first receptacle for a hollow shaft portion which is rotatable around its center axis depending on requirements in proportion to its axial forward feed.

The above-mentioned device serves for producing a transmission shaft of a countershaft-type manual transmission which forms one of at least two substantially identical countershafts and which is constructed from a plurality of hollow shaft portions which are butt press welded to one another. At least two of the hollow shaft portions are provided in each instance with at least one helical toothing of a fixed wheel of a spur gear stage. When a hollow shaft portion provided with at least one helical toothing of a fixed wheel is axially joined to an adjacent hollow shaft portion, then in order to enable a rotation of the hollow shaft portion corresponding to an axial offset occurring as a result of the joining, the device is provided with a pressure die having a first receptacle for the hollow shaft portion to be joined, and the pressure die is rotatable around its center axis in proportion to its axial forward feed if required.

Figure 3:
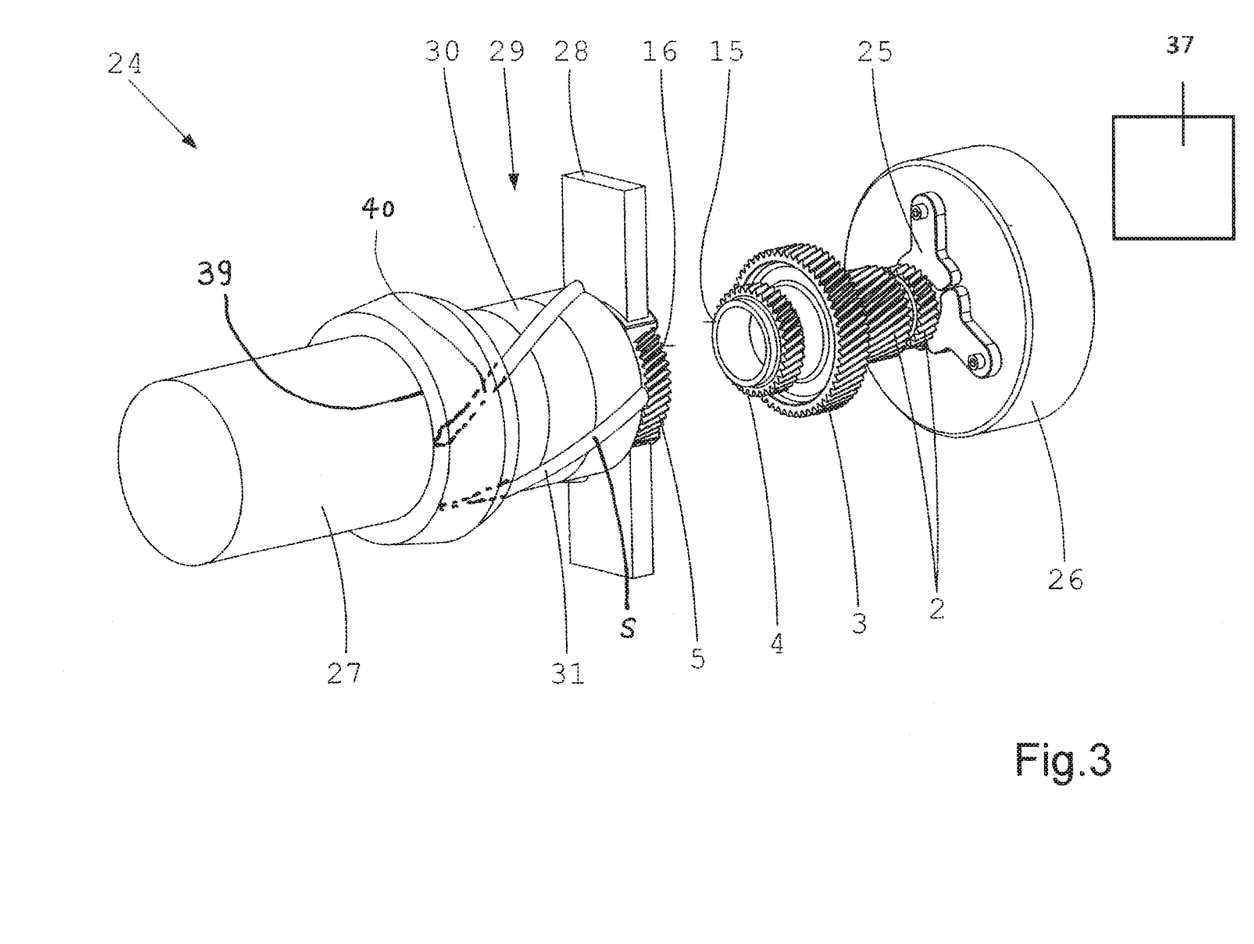
FIG. 3 shows a device for producing a transmission shaft according to FIGS. 1 and 2 in a schematic perspective view.

The pressure die 27 can be actively rotatable by a controllable rotary motor 26, i.e., a rotary motor which can be switched on and switched off and which can be regulated with respect to its rotational speed. However, this requires a separate rotary motor with a corresponding control device. (FIG. 3)

Alternatively, the pressure die 27 can also be passively rotatable in proportion to the axial forward feed by an engine-internal coupling gear stage which can be switched on and switched off and which has a gear ratio corresponding to the pitch of the helical toothing. Coupling gear stages of this type by which a rotary drive is coupled to an axial forward feed are known from lathes, for example.

However, it is preferable that the pressure die 27 is passively rotatable by a positive-engagement rotary guide 29 which can be switched on and switched off and which is arranged between a cylindrical portion of the pressure die and a stationary bore hole 39 and has the pitch s of the helical toothing. A rotary guide of the pressure die such as this is constructed in a relatively simple manner, can be produced inexpensively and incurs a particularly low expenditure on apparatus and control compared to the constructions mentioned above.

The rotary guide is formed, for example, from at least one radially protruding guide strip arranged at the cylindrical portion of the pressure die and at least one guide groove arranged in the stationary bore hole 39, and the guide strip 31 and guide groove 40 each have the pitch of the helical toothing, and the guide strip 31 engages in the guide groove 40 when the rotary guide 29 is moved in. (FIG. 3)

The device according to the invention can be configured to connect the hollow shaft portions by spin welding and can have a further rotatable receptacle for an adjacent hollow shaft portion which is in driving connection with a controllable rotary drive and a controllable brake 37 for plasticizing the facing contact surfaces of the two adjacent hollow shaft portions. A typical device for spin welding tubular workpieces without a rotary drive of the workpiece to be joined is known from, DE 195 23 240 C1, for example, the entire content of which is incorporated herein by reference.

Figure 5:
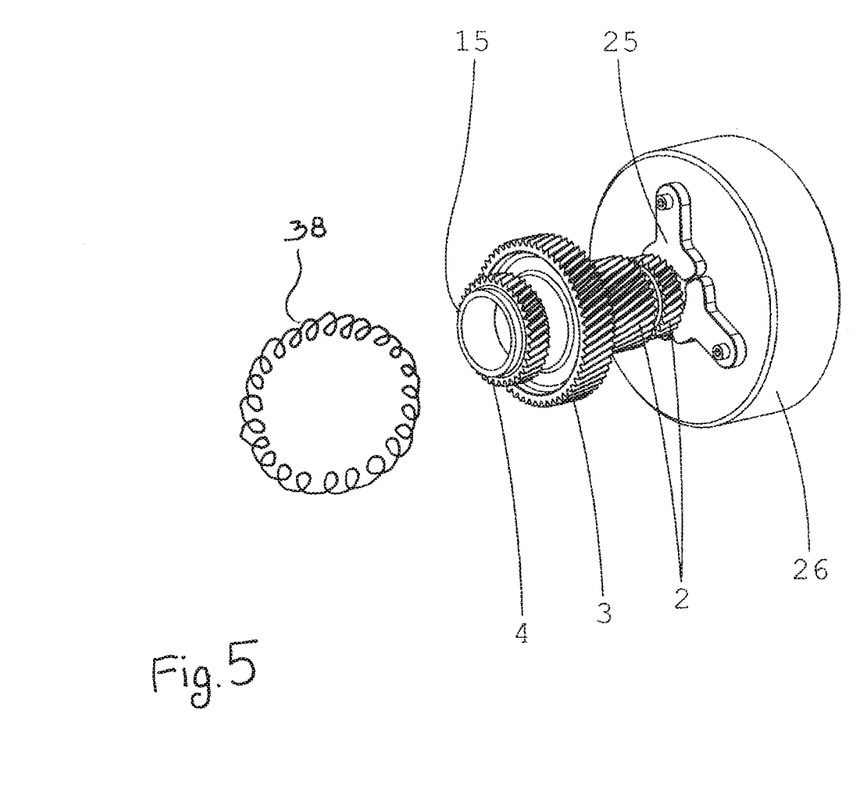
FIG. 5 shows a schematic view of another device for producing a transmission shaft according to FIGS. 1 and 2.

Alternatively, the device according to the invention can also be constructed for connecting the hollow shaft portions by electric arc welding with magnetically controlled arcs and can have a further receptacle for an adjacent hollow shaft portion and an annular pole-and-coil arrangement 38 for plasticizing the facing contact surfaces of the two adjacent hollow shaft portions. (FIG. 5) A typical device for electric arc welding with magnetically controlled arcs without a rotary drive of the workpiece to be joined is described in DE 30 18 199 C2, for example, the content of which is incorporated herein by reference in its entirety.

BRIEF DESCRIPTION OF THE DRAWINGS

To further illustrate the invention, the description is accompanied by drawings with embodiment examples. The drawings show.

DETAILED DESCRIPTION OF THE PRESENTLY PREFERRED EMBODIMENTS

Figure 1:
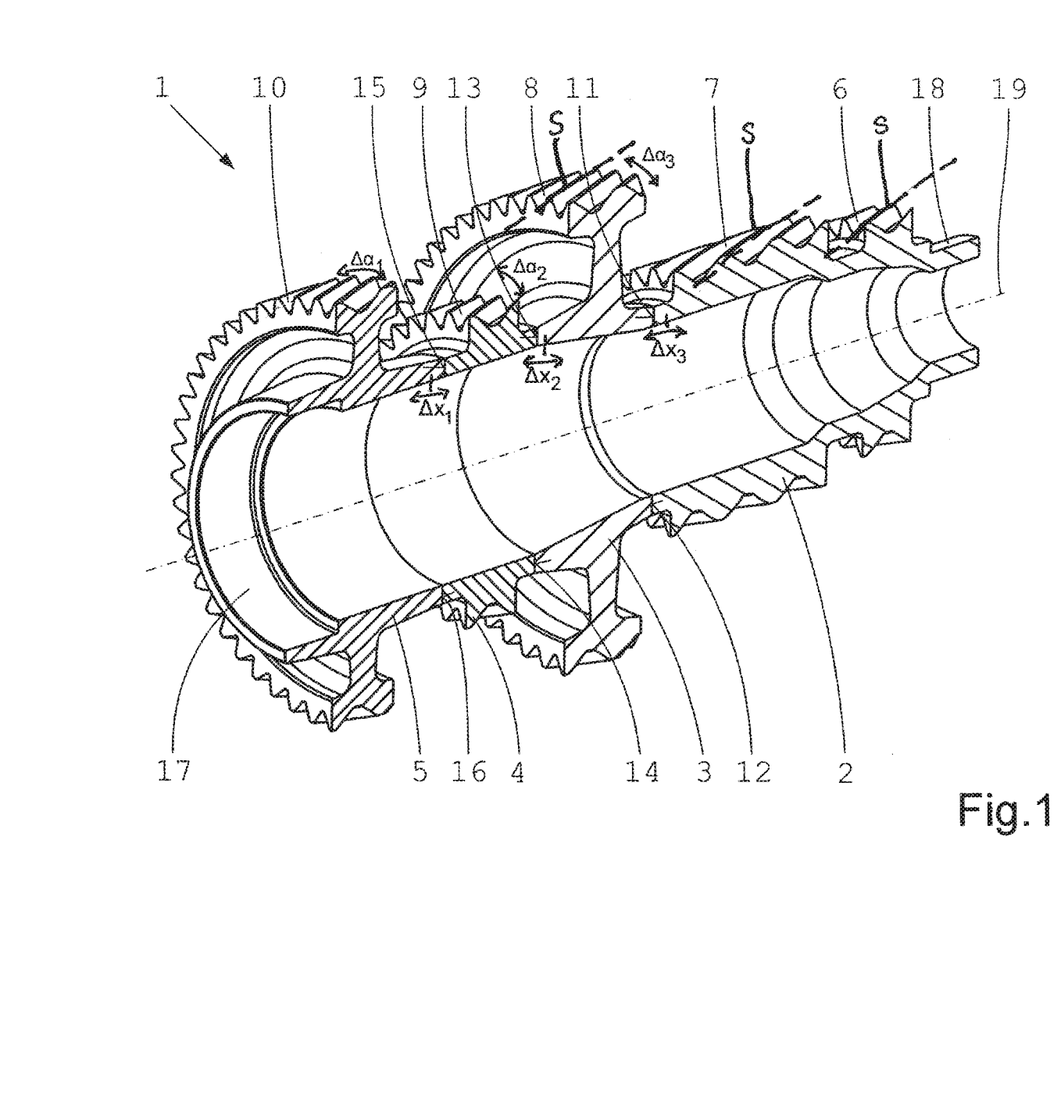
FIG. 1 is a perspective sectional view of a transmission shaft according to the invention.

A transmission shaft 1, shown in longitudinal section as an embodiment example in FIG. 1, forms one of at least two substantially identical countershafts of a countershaft-type manual transmission. The transmission shaft 1 according to the invention is formed as a hollow shaft and is constructed from four hollow shaft portions 2, 3, 4, 5 which are butt press welded to one another. Each of these four hollow shaft portions 2, 3, 4, 5 is integrally provided with at least one helical toothing 6, 7, 8, 9, 10 and has, in each instance, annular contact surfaces 11, 12, 13, 14, 15, 16 facing one another. As is customary, the helical toothings 6, 7, 8, 9, 10 have an identical pitch s, as indicated in the drawing, so that the axial forces occurring within the transmission shaft 1 during the transmission of force are canceled and need not be absorbed via a bearing.

A first helical toothing 6 arranged on the first hollow shaft portion 2 forms the fixed wheel of a first spur gear stage, which fixed wheel is arranged on the transmission shaft 1. A wider, second helical toothing 7 arranged on the first hollow shaft portion 2 forms the shared fixed wheel of two further spur gear stages of the manual transmission, which shared fixed wheel is arranged on the transmission shaft 1. A third helical toothing 8 arranged on the second hollow shaft portion 3 forms the fixed wheel of a fourth spur gear stage of the manual transmission, which fixed wheel is arranged on the transmission shaft 1. A fourth helical toothing 9 arranged on the third hollow shaft portion 4 forms the fixed wheel of a fifth spur gear stage of the manual transmission, which fixed wheel is arranged on the transmission shaft 1. A fifth helical toothing 10 arranged on the fourth hollow shaft portion 5 forms the fixed wheel of a sixth spur gear stage of the manual transmission, which fixed wheel is arranged on the transmission shaft 1.

The second hollow shaft portion 3 was joined to the first hollow shaft portion 2 after plasticizing the material at the contact surfaces 11, 12 facing one another by axial pressing with high pressing force. While axially joining to the first hollow shaft portion 2, the second hollow shaft portion 3 was rotated around the center axis 19 by a correction angle $\Delta\alpha_3$ in proportion to an individual deviation $\Delta x_3$ from its axial target position, where the ratio between the correction angle $\Delta\alpha_3$ and the axial deviation $\Delta x_3$ corresponds to the pitch s of the helical toothing 8 ($\Delta\alpha/\Delta x=s$).

The third hollow shaft portion 4 was joined to the second hollow shaft portion 3 after plasticizing the material at the contact surfaces 13, 14 facing one another by axial pressing with high pressing force. While axially joining to the second hollow shaft portion 3, the third hollow shaft portion 4 was rotated around the center axis 19 by a correction angle $\Delta\alpha_2$ in proportion to an individual deviation $\Delta x_2$ from its axial target position also corresponding to the pitch s of the helical toothing 9.

The fourth hollow shaft portion 5 was joined to the third hollow shaft portion 4 after plasticizing the material at the contact surfaces 15, 16 facing one another by axial pressing with high pressing force. While axially joining to the third hollow shaft portion 4, the fourth hollow shaft portion 5 was also rotated corresponding to the pitch s of the helical toothing 10 around the center axis 19 by a correction angle $\Delta\alpha_1$ in proportion to a deviation $\Delta x_1$ from its axial target position.

As a result of the respective rotation of the hollow shaft portions 3, 4, 5 to be joined, the respective deviation $\Delta x$ of the hollow shaft portions 3, 4, 5 from their axial target position with respect to the circumferential angular position of the helical toothings 8, 9, 10 is compensated during the axial joining process resulting in an optimal toothing engagement of these helical toothings 8, 9, 10 with the associated counter-gearwheels of the manual transmission.

The transmission shaft 1 is rotatably supported in a transmission housing in a manner known per se via a fixed bearing 20 and a loose bearing 22. As can be seen from the perspective views of FIG. 1 and FIG. 2, the fixed bearing 20 which is formed as a grooved ball bearing 21 is arranged at an inner bearing seat 17 of the fourth hollow shaft portion 5. The loose bearing 22 which is formed as a cylindrical roller bearing 23 is correspondingly arranged at an outer bearing seat 18 of the first hollow shaft portion 2 at the axially opposite end of the transmission shaft 1. Since the fourth hollow shaft portion 5 and helical toothing 10 thereof are correctly axially positioned in the transmission housing with this arrangement of the bearings 20, 22, the correction of the circumferential angular position carried out during the process of axial joining the hollow shaft portions 3, 4, 5 now results in a corresponding turning back of the helical toothings 6, 7, 8, 9 of the first three hollow shaft portions 2, 3, 4 so that an optimal toothing engagement of these helical toothings 6, 7, 8, 9 with the associated counter-gearwheels of the manual transmission is also achieved.

Figure 2:
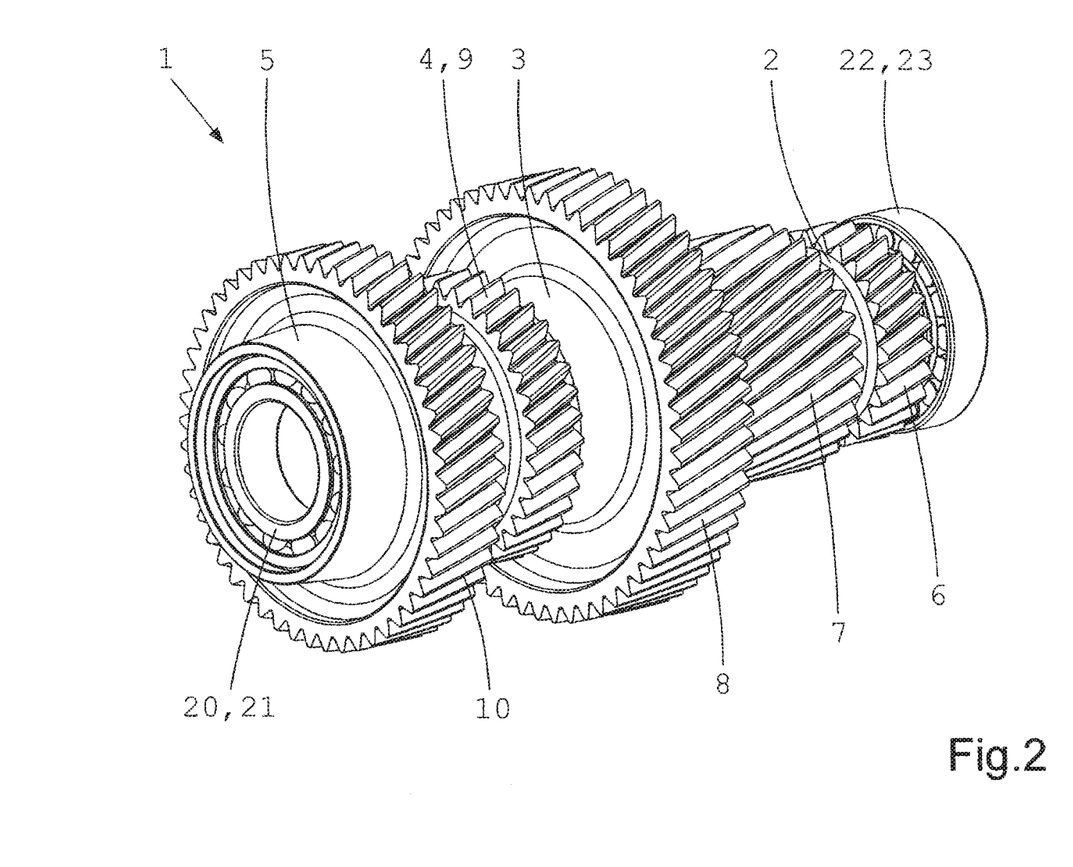
FIG. 2 is a full view in perspective of the transmission shaft according to FIG. 1 with bearings.

A preferred embodiment form of a device 24 for producing a transmission shaft according to FIG. 1 and FIG. 2 is shown schematically in FIG. 3. The device 24 serves to connect the hollow shaft portions 2, 3, 4, 5 by spin welding.

The device 24 has a first receptacle 25 for a hollow shaft portion 2, 3, 4 which is in driving connection with a controllable rotary drive 26 and a controllable brake 37, for plasticizing the facing contact surfaces 11, 12; 13, 14; 15, 16 of the respective adjacent hollow shaft portions 2, 3; 3, 4; 4, 5. The first receptacle 25 is constructed as a clamping chuck in the present instance. The device 24 further has a pressure die 27 with a second receptacle 28 for a hollow shaft portion 3, 4, 5 to be joined, which hollow shaft portion 3, 4, 5 is rotatable around its center axis according to requirements in proportion to its axial forward feed. By means of the pressure die 27, the hollow shaft portion 3, 4, 5 to be joined is initially pressed against the adjacent hollow shaft portion 2, 3, 4 with moderate pressing force for plasticizing the material in the region of the contact surfaces 11, 12; 13, 14; 15, 16 and after plasticizing is pressed against the adjacent hollow shaft portion 2, 3, 4 with high pressing force. The second receptacle 28 is constructed as a stationary radial guide in the present instance.

A positive-engagement rotary guide 29 is provided for rotating the pressure die 27 and is arranged between a cylindrical portion 30 of the pressure die 27 and a stationary bore hole 39, and has the pitch s of the helical toothings 6, 7, 8, 9, 10. The rotary guide 29 comprises a plurality of radially protruding guide strips 31 which are arranged on the cylindrical portion 30 of the pressure die 27 and corresponding guide grooves 40 (indicated by dotted lines in FIG. 3) which are arranged in the stationary bore hole and in which the guide strips 31 engage. The guide strips 31 and guide grooves 40 have the pitch s of the helical toothings 6, 7, 8, 9, 10 in each instance.

In the illustration in FIG. 3, the first hollow shaft portion 2 is fastened in the receptacle 25 of the rotary drive 26. The second hollow shaft portion 3 is already fastened to the first hollow shaft portion 2, and the third hollow shaft portion 4 is already joined to the second hollow shaft portion 3. The fourth hollow shaft portion 5 is fixed in the receptacle 28 of the pressure die 27.

After the hollow shaft portions 4, 5 which are initially not yet connected are moved together axially, the third hollow shaft portion 4 is rotated by means of the rotary drive 26 and the fourth hollow shaft portion 5 is pressed against the third hollow shaft portion 4 with moderate pressing force by the pressure die 27. After the plasticizing of the material in the region of the contact surfaces which face one another, the third hollow shaft portion 4 is braked and fixed in correct position with respect to its circumferential angular position. The fourth hollow shaft portion 5 is then pressed against the third hollow shaft portion 4 with high pressing force by the pressure die 27 so that these two hollow shaft portions 4, 5 are connected to one another.

A deviation of the fourth hollow shaft portion 5 from its axial target position occurring during the axial joining process causes a proportionate rotation of the fourth hollow shaft portion 5 around the center axis 19 due to the rotary guide 29. Since the ratio between the correction angle $\Delta\alpha$ of the rotation and the deviation $\Delta x$ from the axial target position of the fourth hollow shaft portion 5 corresponds to the pitch s of the helical toothing 10 ($\Delta\alpha/\Delta x=s$), the fourth hollow shaft portion 5 is accordingly optimally aligned for an optimal toothing engagement of the helical toothing 10 with the associated counter-gearwheel. This also applies, of course, to the second hollow shaft portion 3 previously joined to the first hollow shaft portion 2 and to the third hollow shaft portion 4 previously joined to the second hollow shaft portion 3.

Figure 4:
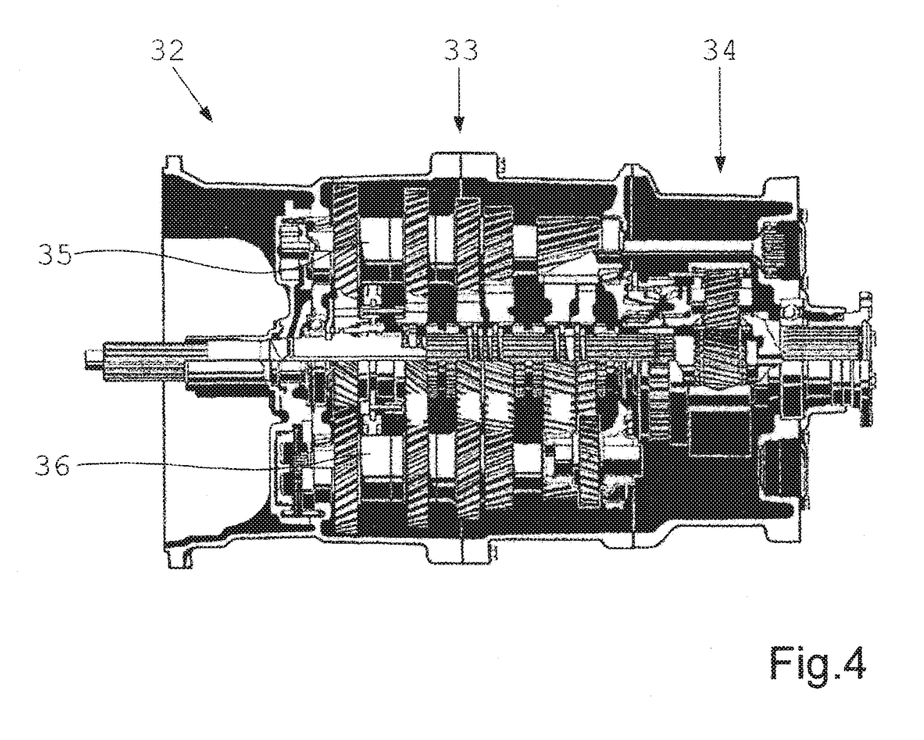
FIG. 4 shows a known manual transmission for utilizing the transmission shaft according to FIG. 1 and FIG. 2 in longitudinal central section.

A known compound-type AS-Tronic-series manual transmission 32 by the present Applicant is shown in FIG. 4 in longitudinal central section as a use example for the transmission shaft 1 according to the invention. The manual transmission 32 has a countershaft-type main transmission 33 and a planetary range group 34 downstream of the main transmission 33 in drive direction. The main transmission 33 has two substantially identical countershafts 35, 36 with a plurality of helical teeth of fixed wheels of associated spur gear stages. Therefore, the two countershafts 35, 36 of this manual transmission 32 are particularly suitable to be constructed in accordance with the transmission shaft 1 according to the invention and to be produced according to the described method.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission shaft (1) of a countershaft-type manual transmission which forms one of at least two substantially identical countershafts, comprising
   a plurality of hollow shaft portions (2; 3; 4; 5) butt press welded to one another, at least two of said hollow shaft portions (2; 3; 4; 5) provided in each instance with at least one helical toothing (6, 7, 8, 9, 10) having a pitch(s) and forming a fixed wheel of a spur gear stage; said hollow shaft portions (2; 3; 4; 5) provided with said helical toothing (8; 9; 10) being connected to a respective adjacent hollow shaft portion (2; 3; 4) in each instance by being rotated by a correction angle ($\Delta\alpha$) around a center axis (19) in proportion to a deviation ($\Delta x$) from an axial target position; and wherein the ratio between said correction angle ($\Delta\alpha$) and said axial deviation ($\Delta x$) corresponds to said pitch (s) of said helical toothing (8; 9; 10) ($\Delta\alpha/\Delta x=s$).

2. The transmission shaft according to claim 1, wherein said hollow shaft portions (2; 3; 4; 5) are connected to one another by spin welding.

3. The transmission shaft according to claim 1, wherein said hollow shaft portions (2; 3; 4; 5) are connected to one another by electric arc welding with magnetically moving arcs.

4. The transmission shaft according to claim 1, wherein said helical toothings (8; 9; 10) of said hollow shaft portions (3; 4; 5) are carried out with an axial excess width relative to their respective counter-gearwheels to compensate for axial tolerances.

5. The transmission shaft according to claim 1, additionally comprising a bearing seat with a fixed bearing (20) and a bearing seat with a loose bearing (22); and wherein the fixed bearing (20) is arranged at a first hollow shaft portion (2) to which a second hollow shaft portion (3) is fastened, and the loose bearing (22) is arranged at a last hollow shaft portion (5) which is fastened to a penultimate hollow shaft portion (4).

6. The transmission shaft according to claim 1, additionally comprising a bearing seat with a fixed bearing (20) and a bearing seat with a loose bearing (22), wherein the fixed bearing (20) is arranged at a last hollow shaft portion (5) which is fastened to a penultimate hollow shaft portion (4), and the loose bearing (22) is arranged at a first hollow shaft portion (2) to which a second hollow shaft portion (3) is fastened.

7. The transmission shaft according to claim 5, wherein said fixed bearing (20) is constructed as a grooved ball bearing (21) and said loose bearing (22) is constructed as a cylindrical roller bearing (23).

8. A method of producing a transmission shaft (1) of a countershaft-type manual transmission which forms one of at least two substantially identical countershafts, said method comprising the following steps:
constructing the transmission shaft from a plurality of hollow shaft portions (2; 3; 4; 5);
providing at least two of the hollow shaft portions (2; 3; 4; 5) in each instance with at least one helical toothing (6, 7, 8, 9, 10) of a fixed wheel of a spur gear stage;
plasticizing the material at the facing contact surfaces (11, 12; 13, 14; 15, 16) during the axial joining of the adjacent hollow shaft portion (2; 3; 4) during butt press welding; and
rotating the hollow shaft portions (3; 4; 5) provided with the helical toothing (8; 9; 10) by a correction angle ($\Delta\alpha$) around the center axis (19) of the hollow shaft portions in proportion to a deviation ($\Delta x$) from the axial target position of the hollow shaft portion in each instance after the plasticizing step and wherein the ratio between the correction angle ($\Delta\alpha$) and the axial deviation ($\Delta x$) corresponds to the pitch (s) of the helical toothing (8; 9; 10) ($\Delta\alpha/\Delta x=s$).

9. The method according to claim 8, wherein the rotation of the hollow shaft portions (3; 4; 5) is carried out in each instance by a rotary drive (26) in driving connection with a pressure die (27) which receives the respective hollow shaft portion (3; 4; 5) at its end.

10. The method according to claim 8, wherein the rotation of the hollow shaft portions (3; 4; 5) is carried out by a positive-engagement rotary guide (29) arranged between a cylindrical portion (30) of the pressure die (27) receiving the respective hollow shaft portion (3; 4; 5) at its end and a stationary bore hole (39) and which has the pitch (s) of the helical toothing (8; 9; 10).

11. The method according to claim 9, wherein the hollow shaft portions (2; 3; 4; 5) are connected to one another by spin welding, wherein the plasticizing of the contact surfaces (11, 12; 13, 14; 15, 16) facing one another is carried out in each instance through rotation of a hollow shaft portion (2; 3; 4) which is not axially displaceable and by a simultaneous axially pressing of the nonrotatable hollow shaft portion (3; 4; 5) against the rotatable hollow shaft portion (2; 3; 4) with moderate pressing force via the pressure die (27), and wherein the joining together of the hollow shaft portions (2; 3; 4; 5) is carried out after the plasticizing of the contact surfaces (11, 12; 13, 14; 15, 16) by axially pressing the nonrotatable hollow shaft portion (3; 4; 5) against the rotatable hollow shaft portion (2; 3; 4) with high pressing force by the pressure die (27).

12. The method according to claim 9, wherein the hollow shaft portions (2; 3; 4; 5) are connected to one another through electric arc welding with magnetically moving arcs, wherein the plasticizing of the contact surfaces (11, 12; 13, 14; 15, 16) facing one another is carried out in each instance through a magnetically controlled arc circulating between stationary poles and the region of the contact surfaces (11, 12; 13, 14; 15, 16), and wherein the joining together of the hollow shaft portions (2; 3; 4; 5) is carried out after the plasticizing of the contact surfaces (11, 12; 13, 14; 15, 16) by axially pressing the one hollow shaft portion (3; 4; 5) against the other hollow shaft portion (2; 3; 4) with high pressing force by the pressure die (27).

13. The transmission shaft according to claim 6, wherein said fixed bearing (20) is constructed as a grooved ball bearing (21) and said loose bearing (22) is constructed as a cylindrical roller bearing (23).

14. The method according to claim 10, wherein the hollow shaft portions (2; 3; 4; 5) are connected to one another by spin welding, wherein the plasticizing of the contact surfaces (11, 12; 13, 14; 15, 16) facing one another is carried out in each instance through rotation of a hollow shaft portion (2; 3; 4) which is not axially displaceable and by a simultaneous axially pressing of the nonrotatable hollow shaft portion (3; 4; 5) against the rotatable hollow shaft portion (2; 3; 4) with moderate pressing force via the pressure die (27), and wherein the joining together of the hollow shaft portions (2; 3; 4; 5) is carried out after the plasticizing of the contact surfaces (11, 12; 13, 14; 15, 16) by axially pressing the nonrotatable hollow shaft portion (3; 4; 5) against the rotatable hollow shaft portion (2; 3; 4) with high pressing force by the pressure die (27).

15. The method according to claim 10, wherein the hollow shaft portions (2; 3; 4; 5) are connected to one another through electric arc welding with magnetically moving arcs, wherein the plasticizing of the contact surfaces (11, 12; 13, 14; 15, 16) facing one another is carried out in each instance through a magnetically controlled arc circulating between stationary poles and the region of the contact surfaces (11, 12; 13, 14; 15, 16), and wherein the joining together of the hollow shaft portions (2; 3; 4; 5) is carried out after the plasticizing of the contact surfaces (11, 12; 13, 14; 15, 16) by axially pressing the one hollow shaft portion (3; 4; 5) against the other hollow shaft portion (2; 3; 4) with high pressing force by the pressure die (27).

* * * * *